US008439329B2

(12) United States Patent
Kresse et al.

(10) Patent No.: US 8,439,329 B2
(45) Date of Patent: May 14, 2013

(54) METHOD AND DEVICE FOR OPERATING AN ELECTROPNEUMATIC VALVE

(75) Inventors: Heiko Kresse, Obernkirchen (DE); Stefan Tabelander, Herford (DE)

(73) Assignee: ABB Technology AG, Zurich (CH)

(*) Notice: Subject to any disclaimer, the term of this patent is extended or adjusted under 35 U.S.C. 154(b) by 558 days.

(21) Appl. No.: 12/483,011

(22) Filed: Jun. 11, 2009

(65) Prior Publication Data

US 2009/0309052 A1 Dec. 17, 2009

(30) Foreign Application Priority Data

Jun. 12, 2008 (DE) ......................... 10 2008 028 190

(51) Int. Cl.
*F16K 31/42* (2006.01)

(52) U.S. Cl.
USPC ............... 251/129.04; 251/30.01; 137/625.64

(58) Field of Classification Search ............. 251/129.04, 251/30.01; 137/487.5, 488, 625.2, 625.64
See application file for complete search history.

(56) References Cited

U.S. PATENT DOCUMENTS

| | | | | |
|---|---|---|---|---|
| 3,462,115 | A * | 8/1969 | Barker | 251/29 |
| 3,586,287 | A * | 6/1971 | Knobel | 251/24 |
| 3,752,189 | A | 8/1973 | Marr et al. | |
| 4,481,967 | A * | 11/1984 | Frick | 137/85 |
| 4,543,875 | A * | 10/1985 | Imhof | 91/459 |
| 4,798,527 | A * | 1/1989 | Gunda | 425/145 |
| 4,855,659 | A * | 8/1989 | Riensche | 318/645 |
| 4,901,758 | A * | 2/1990 | Cook et al. | 137/487.5 |
| 5,038,821 | A * | 8/1991 | Maget | 137/486 |
| 5,244,002 | A * | 9/1993 | Frederick | 137/1 |
| 5,431,182 | A * | 7/1995 | Brown | 137/85 |
| 5,573,032 | A * | 11/1996 | Lenz et al. | 137/486 |
| 5,651,385 | A * | 7/1997 | Karte | 137/83 |
| 5,931,180 | A * | 8/1999 | Nagasaka | 137/85 |
| 5,950,668 | A * | 9/1999 | Baumann | 137/487.5 |
| 6,055,950 | A * | 5/2000 | Schafer et al. | 123/90.17 |
| 6,109,284 | A * | 8/2000 | Johnson et al. | 137/1 |
| 6,142,181 | A * | 11/2000 | Schumacher | 137/625.21 |
| 6,615,114 | B1 * | 9/2003 | Skiba et al. | 700/275 |
| 6,966,285 | B1 * | 11/2005 | Sun | 123/90.12 |

(Continued)

FOREIGN PATENT DOCUMENTS

| | | |
|---|---|---|
| DE | 42 40 802 A1 | 6/1994 |
| DE | 44 31 600 A1 | 3/1996 |
| EP | 1 758 007 A1 | 2/2007 |

OTHER PUBLICATIONS

German Examination Report dated Dec. 8, 2008.

*Primary Examiner* — John Rivell
*Assistant Examiner* — Minh Le
(74) *Attorney, Agent, or Firm* — Buchanan Ingersoll & Rooney PC

(57) ABSTRACT

The disclosure relates to a method and device for operating an electropneumatic valve for driving a pneumatic actuator drive to activate fittings in automation systems. The valve has at least one electropneumatic transducer and a pneumatic booster. The pneumatic booster has at least one 3/3 way valve with a blocking center position for optionally connecting an air inflow duct or an air outflow duct to a connecting duct, which connects to the actuator drive. The ducts are activated as a function of an electrical actuation signal by the electropneumatic transducer. At least one position of the 3/3 way valve with a blocking center position is measured and a correction value of a variable of the actuation signal is determined based on the measured value and the electrical actuation signal.

19 Claims, 2 Drawing Sheets

U.S. PATENT DOCUMENTS 7,543,595 B2 * 6/2009 Jacob et al. ........................ 137/9
2005/0126639 A1 * 6/2005 Ens et al. ....................... 137/554
2007/0045579 A1 3/2007 Wirtl et al.
2008/0099069 A1 * 5/2008 Cook ............................... 137/14

* cited by examiner

METHOD AND DEVICE FOR OPERATING AN ELECTROPNEUMATIC VALVE

RELATED APPLICATION

This application claims priority under 35 U.S.C. §119 to German Patent Application No. 10 2008 028 190.5 filed in Germany on Jun. 12, 2008, the entire content of which is hereby incorporated by reference in its entirety.

FIELD

The present disclosure relates to a method and device for operating an electropneumatic valve for driving pneumatic actuator drives to activate fittings in automation systems.

BACKGROUND INFORMATION

Electropneumatic valves are used to drive and control the position of actuator drives or control drives, including both single-acting and double-acting designs, as well as for blocking and venting designs.

Valves of this type are known in principle. See, for example, EP 1758 007 A1. According to this document, the valve is composed of at least a control pressure regulator, a pneumatic booster, an electropneumatic transducer, an air inflow duct, an air outflow duct, and a connecting duct which connects to the actuator drive.

A pneumatic booster is understood within the scope of this description to be a technical device which controls a pneumatic output signal using a pneumatic input signal.

The electropneumatic transducer can be supplied here with an operating medium from the air inflow duct. This operating medium is typically a compressed gas, but any other fluid medium can be utilized. The operating medium which is fed to the electropneumatic transducer usually has a pneumatic pressure which is required to position the drive. In order to perform internal control of the pneumatic booster, a significantly lower control pressure of the same operating medium, which is as constant as possible, is extracted from the air inflow duct. For this purpose, the operating medium is fed to a control pressure regulator which reduces the pressure of the operating medium to the desired control pressure and regulates it to a constant value. The pneumatic booster is controlled with the operating medium which is reduced to the control pressure. Possible impurities are kept away from the pneumatic system by means of filters.

The electropneumatic valve is activated by feeding in electrical energy after the electropneumatic valve has been supplied with the operating medium as a pneumatic energy carrier. For this purpose, the electropneumatic valve is equipped with an electropneumatic transducer, which is driven electrically and manipulates the control pressure to perform pneumatic driving of the pneumatic booster.

The electropneumatic transducer is a converter which, on the basis of an electrical input signal, influences the control pressure circuit of the pneumatic booster in a selective fashion. By means of this electropneumatic transducer it is possible to control the pneumatic booster in such a way that, in a first operating mode, the operating medium is fed in a selective fashion from the air inflow duct into the connecting duct which connects to the pneumatic actuator drive, or, in a second operating mode, the operating medium is fed in a selective fashion from the pneumatic actuator drive into the atmosphere via the air outflow duct, or, in a third operating mode, the operating medium is enclosed in a selective fashion in the actuator drive maintain the instantaneous position of the actuator drive. For this purpose, the pneumatic booster has a first pneumatic valve for connecting the air inflow duct to the connecting duct which connects to the actuator drive, and a second pneumatic valve for connecting the air outflow duct to the connecting duct which connects to the actuator drive. Such an arrangement is referred to according to the standards as a 3/3 way valve with a blocking center position.

EP 1758 007 A1 also discloses equipping the electropneumatic transducer with piezoelectric bender actuators which can be driven with a small amount of electrical energy. The low energy demand is a core requirement for use in two-conductor devices in automation equipment which draw their energy from a 4.20 mA current loop via their driving signal.

A transmission characteristic curve can describe the assignment of the electrical input signal in an electrical unit at the electropneumatic transducer to the output signal at the connecting duct which connects to the actuator drive as a set opening cross section or as a through-flow unit. The transmission characteristic curve can be defined, for example, by three characteristic ranges which, starting from the venting range, extends via the sealing-tight range to the ventilation range.

The sealing-tight range describes the range of electrical driving in which the electropneumatic valve seals tight the side located on the connecting duct which connects to the actuator drive with respect to all possible ventilation and venting paths. In the ventilation range, the output of air through the connecting duct which connects to the actuator drive is essentially proportional to the electrical driving signal with a very largely constant gradient up to the full air output signal. In the venting range, the air output signal at the air outflow side follows the electrical driving signal essentially proportionally, with a very largely constant gradient up to the full air outflow rate.

The transition from the sealing-tight range into the venting range is the opening point for venting, and the transition from the sealing-tight range into the ventilation range is the opening point for ventilation. The opening points for ventilation and venting are highly significant for the use of the electropneumatic valve in an electropneumatic position regulator for high regulating quality with respect to the connected actuator drive.

A high regulating quality is impeded in an electropneumatic valve of this type by the hysteresis between the forward characteristic curve and return characteristic curve and the drift of the opening points. In the case of electropneumatic transducers with piezo technology, these effects are due in particular to the piezo ceramic and are dependent on ambient influences such as the temperature of the piezo ceramic and/or moisture/soiling on its surface and resulting leakage currents. In particular, valves with piezo bender actuators can be provided with a corresponding surface. These effects occur in a similar form with magneto-inductive driving means.

However, other influences such as extension of the length of the materials used, friction in the overall structure and adjustment devices, and the mechanical setting behavior of the electropneumatic transducer, which can be caused, in particular, by temperature cycles over the permissible temperature range, also cause these effects.

Since the opening points drift over such influencing variables, an opening point cannot be reliably assigned to a previously determined electrical actuation variable for the pilot control valve. Alternatively, a through-flow quantity at the output which is sufficiently small for a regulating process cannot be reliably assigned to a constant value which is applicable at any time and has been determined by calibration when the system was activated.

The compensation of hysteresis can also be significant for the regulating quality. Since there is an offset between a forward characteristic curve and a return characteristic curve, the pneumatic booster does not follow the electrical actuation variable directly. Since the magnitude of the hysteresis is also subject to such ambient influences, it is not known, at the operating time, how much the actuation variable has to be changed in order to control the opening cross section or the quantity of air in the pneumatic booster with the desired order of magnitude in the opposite direction.

SUMMARY

An exemplary method is provided for operating an electropneumatic valve to drive a pneumatic actuator drive. The electrompneumatic valve has at least one electropneumatic transducer and at least one pneumatic booster. The pneumatic booster has at least one 3/3 way valve with a blocking center position for optionally connecting a connecting duct, which is connectable to the actuator drive, to at least one of an air inflow duct and an air outflow duct, which ducts can be activated by means of the electropneumatic transducer as a function of an electrical actuation signal. According to an exemplary embodiment, at least one position of the 3/3 way valve with a blocking center position can be measured, and a correction value of a variable of the electrical activation signal can be determined based on the measured value and the electrical actuation signal.

An exemplary device provided herein is configured to operate an electropneumatic valve. The electropneumatic valve can be configured to drive a pneumatic actuator drive, and can include at least one electropneumatic transducer and at least one pneumatic booster, which can have at least one 3/3 way valve with a blocking center position configured to optionally connect a connecting duct, which can be connectable to the actuator drive, to at least one of an air inflow duct and an air outflow duct. The at least one electropneumatic transducer can be configured to activate the at least one of the air inflow duct and the air outflow duct in accordance with an electrical actuation signal.

According to an exemplary configuration, the device can include an adjustment means for measuring at least one position of the 3/3 way valve with the blocking center, determining a correction value of a variable of the electrical actuation signal based on the measured position and the electrical actuation signal, and adjusting the electrical actuation signal in accordance with the determined correction value.

BRIEF DESCRIPTION OF THE DRAWINGS

Further advantages and details of the disclosure are explained in more detail below with reference to exemplary embodiments. In the drawings which are necessary for this.

DETAILED DESCRIPTION

A method for operating an electropneumatic valve is disclosed which permits the quantity of air at the connecting duct which connects to the actuator drive to be specified and set in accordance with the electrical actuation signal, independent of drift and/or hysteresis.

The disclosure is based on an electropneumatic valve for driving pneumatic actuator drives. The electropneumatic valve can have at least one electropneumatic transducer and a pneumatic booster. The pneumatic booster can have at least a first pneumatic valve for connecting an air inflow duct to a connecting duct which connects to the actuator drive, and a second pneumatic valve for connecting an air outflow duct to the connecting duct which connects to the actuator drive. The actuator drive and values can be which are activated by means of the electropneumatic transducer as a function of an electrical actuation signal.

Exemplary embodiments of the present disclosure are based, in part, on the realization that high regulating quality can be achieved in all the areas of use of the respective end application, in particular in an electropneumatic position regulator, only if the desired cross sections of the valve and therefore the quantities of the operating medium can be set or metered reliably. Knowledge of the actual opening points facilitates this. The gradient of the characteristic curve is largely unaffected in this context.

According to an exemplary embodiment, at least one position of the 3/3 way valve with a blocking center position is measured, and a correction value of the actuation variable is determined from the measured value from the electrical actuation signal.

Acquiring the actual position of the observed pneumatic valve allows both the influences of the drift of the opening point and the hysteresis on the setting of the quantity of air at the connecting duct which connects to the actuator drive to be eliminated.

According to another exemplary embodiment of the present disclosure, the position of the 3/3 way valve with the blocking center position is measured during a calibration phase. As a result, correct quantities of air can advantageously be set at the very start of the current operation.

According to another exemplary embodiment of the present disclosure, the calibration is adapted during the current operation. This ensures that the influences of the drift of the opening point are compensated.

Figure 1:
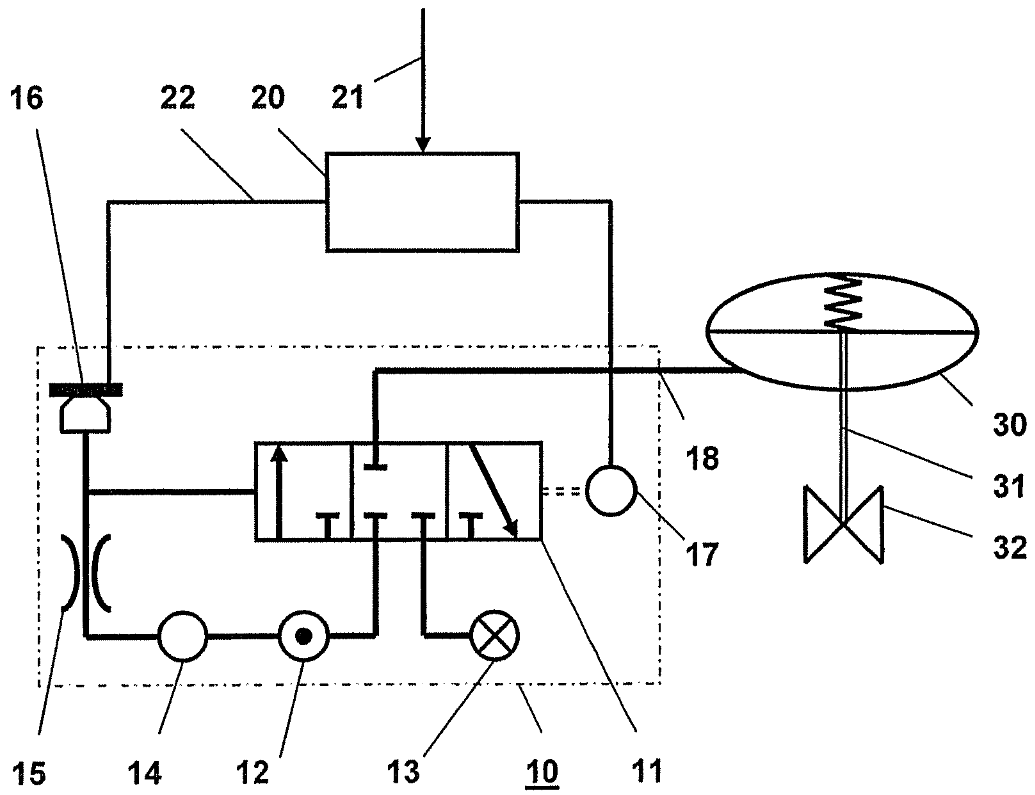
FIG. 1 is a basic illustration of an exemplary electropneumatic valve.

FIG. 1 illustrates an exemplary electropneumatic valve 10 for driving a pneumatic actuator drive 30 which has at least one electropneumatic transducer 16 and at least one pneumatic booster which has a 3/3 way valve with a blocking center position 11. The 3/3 way valve with a blocking center position 11 is designed to optionally connect a connecting duct 18, which connects to the actuator drive 30, to an air inflow duct 12 or to an air outflow duct 13. The correct activation of the 3/3 way valve with a blocking center position 11 is carried out by means of an electropneumatic transducer 16 as a function of an electrical actuation signal 22. For this purpose, the electropneumatic transducer 16 is connected, via a pressure regulator 14 and a throttle device 15, to the air inflow duct 12, and is therefore supplied with a low and constant pressure.

The actuator drive 30 is connected via a lifting rod 31 to a fitting 32 which is suitable for controlling the flow of a process medium through a pipeline.

Figure 2:
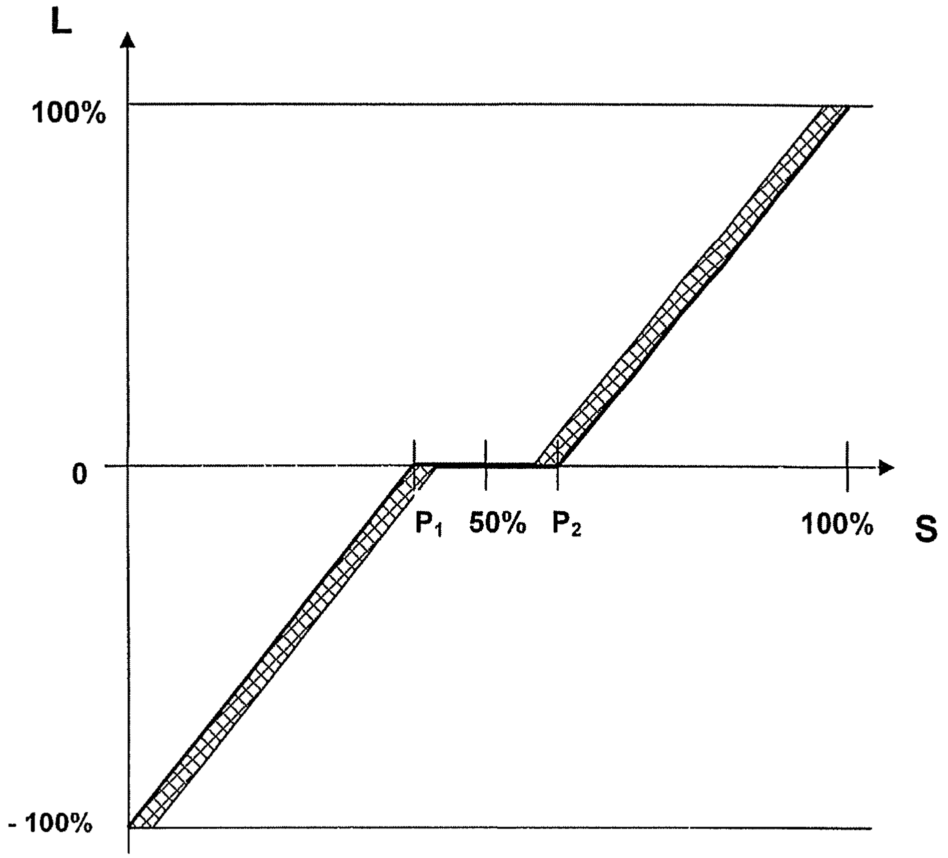
FIG. 2 is a basic illustration of a characteristic curve of an exemplary electropneumatic valve.

The electrical actuation signal 22 for activating the electropneumatic transducer 16 is derived from a setpoint valve 21 using a signal processing device 20. In this context, the transmission characteristic curve of the electropneumatic valve 10 as illustrated in FIG. 2, should be taken into account. As illustrated in the example of FIG. 2, the profile of the air flow L as a measure of the air through-flow rate per time unit in the direction of through-flow plotted against the control voltage S of the electrical actuation signal 22 exhibits, for example, three significant ranges.

In a first range, between 0% control voltage S and an opening point which is denoted by $P_1$, the air flow L is negative, which means that the actuator drive 30 is being vented. In this context, the 3/3 way valve with the blocking center position 11 is set in such a way that the connecting duct 18, which connects to the actuator drive 30, is connected to the air outflow duct 13. Consequently, the air which is stored in the actuator drive 30 passes through the air outflow duct 13 into the surrounding environment.

In a subsequent second range of the control voltage S between the opening points $P_1$ and $P_2$, the air flow L is equal to zero, which means that the connecting duct 18, which connects to the actuator drive 30, is sealed tight with respect to all possible ventilation and venting paths. In this context, the 3/3 way valve with a blocking center position 11 is in its blocking center position. Consequently, the air is stored in the actuator drive 30. The sealing tight range extends virtually symmetrically around approximately 50% of the control voltage S.

Finally, in a subsequent third range of the control voltage S between the opening point $P_2$ and 100% control voltage S, the air flow L is positive, which means that the actuator drive 30 is being ventilated. In this context, the 3/3 way valve with a blocking center position 11 is set in such a way that the connecting duct 18, which connects to the actuator drive 30, is connected to the air inflow duct 12. Consequently, the actuator drive 30 is filled with air.

Furthermore, the behavior of the electropneumatic valve 10 is subject to hysteresis. This means that a change in direction of the control voltage S is transformed into an equivalent change in the air flow L only after a certain delay. This behavior, which is referred to as hysteresis, is illustrated in FIG. 2 by hatched surfaces at the respective characteristic curve sections.

According to FIG. 1, the pneumatic booster which is formed by the 3/3 way valve with a blocking center position 11 has at least one sensor 17 for sensing the position of the 3/3 way valve with a blocking center position 11. In an exemplary configuration of the electropneumatic valve 10, the sensor 17 is of a type which senses in a contactless fashion. In this context, it is possible for the sensor 17 to be of the magneto-inductive sensing type, for example. In particular, the sensor 17 can be formed by an air-core coil.

The sensor 17 can be connected to the signal processing device 20. The signal processing device 20 determines a correction value of a variable of the actuation signal based on the electrical actuation signal 22 and the measured value of the position of the 3/3 way valve with a blocking center position 11. For this purpose, at least one position of the 3/3 way valve with a blocking center position 11 can be measured when there is a predefinable electrical signal to which a manipulated control pressure corresponds, and a correction value of the actuation variable can be determined from the measured value, in acordance with the electrical actuation signal 22. In an exemplary embodiment, the position of the 3/3 way valve with the blocking center position 11 can be measured, for example, during a calibration phase.

The signal processing device 20 can be configured to determine a correction value, which yields the associated electrical actuation signal 22 as an offset with respect to the setpoint value 21. The correction value can be determined from the actuation signal 22 and the measured actual position of the 3/3 way valve with a blocking center position 11. Thus, the signal processing device 20 can, for example, adjust the electrical actuation signal 22 in accordance with the determined correction value. Accordingly, the signal processing device can be a control unit and/or an adjustment means of a device configured to operate the electropneumatic value 10. According to an exemplary embodiment, the position of the 3/3 way valve with the blocking center position 11 can be measured when the 3/3 way valve with the blocking center position 11 is in the fully ventilated position, for example.

Alternatively, it is possible for the position of the 3/3 way valve with the blocking center position 11 to be measured when the 3/3 way valve with the blocking center position 11 is in the fully vented position, for example.

According to another exemplary embodiment of the present disclosure, it is possible for the position of the 3/3 way valve with the blocking center position 11 to be measured when the 3/3 way valve with the blocking center position 11 is in the tightly sealing position, for example.

In another exemplary configuration of the present disclosure, the calibration can be adapted during the current operation. This can counteract the drift of the opening points.

In yet another exemplary configuration of the present disclosure, the calibration of the electropneumatic valve 10 can be carried out during the calibration of the controlled pneumatic actuator drive 30.

Advantageously, the aforementioned exemplary embodiments have such a low energy demand that use in two-conductor devices in automation equipment, which draw their energy from a 4.20 mA current loop by means of their driving signal, is possible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Electropneumatic valve
11 3/3 way valve
12 Air inflow duct
13 Air outflow duct
14 Pressure regulator
15 Throttle device
16 Electropneumatic transducer
17 Sensor
18 Connecting duct
20 Signal processing device
21 Setpoint value
22 Electrical actuation signal
30 Actuator drive
31 Lifting rod
32 Fitting
L Air flow
S Control voltage
$P_1$, $P_2$ Opening point

What is claimed is:

1. A method for operating an electropneumatic valve for driving a pneumatic actuator drive, the electropneumatic valve having at least one electropneumatic transducer and at least one pneumatic booster, which has at least one 3/3 way valve with a blocking center position for optionally connecting a connecting duct which connects to the actuator drive, to at least one of an air inflow duct and an air outflow duct, which are activated by the electropneumatic transducer as a function of an electrical actuation signal, the method comprising:

measuring at least one position of the 3/3 way valve with a blocking center position;

determining a correction value of at least a control voltage variable of the electrical actuation signal from the measured position based on the electrical actuation signal;

adjusting the electrical actuation signal in accordance with the determined correction value; and activating, by the electropneumatic transducer, the at least one of the air inflow duct and the air outflow duct as a function of the adjusted electrical actuation signal to control the at least one pneumatic booster.

2. The method as claimed in claim 1, wherein the at least one position of the 3/3 way valve with the blocking center position is measured during a calibration phase of the 3/3 way valve with the blocking center position.

3. The method as claimed in claim 2, wherein the calibration phase is adapted during a current operation of the 3/3 way valve with the blocking center position.

4. The method as claimed in claim 1, wherein the at least one position of the 3/3 way valve with the blocking center position is measured when the 3/3 way valve with the blocking center position in a fully ventilated position.

5. The method as claimed in claim 1, wherein the at least one position of the 3/3 way valve with the blocking center position is measured when the 3/3 way valve with the blocking center position is in a fully vented position.

6. The method as claimed in claim 1, wherein the at least one position of the 3/3 way valve with the blocking center position is measured when the 3/3 way valve with the blocking center position is in a tightly sealing position with respect to ventilation and venting paths.

7. The method as claimed in claim 1, comprising:

calibrating the electropneumatic valve during a calibration of the pneumatic actuator drive.

8. The method as claimed in claim 3, wherein the at least one position of the 3/3 way valve with the blocking center position is measured when the 3/3 way valve with the blocking center position is in a fully ventilated position.

9. The method as claimed in claim 3, wherein the at least one position of the 3/3 way valve with the blocking center position is measured when the 3/3 way valve with the blocking center position is in a tightly sealing position.

10. The method as claimed in claim 6, comprising:

calibrating electropneumatic valve during the calibration of a pneumatic actuator drive.

11. A device configured to operate an electropneumatic valve, wherein the electropneumatic valve is configured to drive a pneumatic actuator drive, the electropneumatic valve comprising:

at least one electropneumatic transducer; and at least one pneumatic booster, which has at least one 3/3 way valve with a blocking center position configured to optionally connect a connecting duct, which is connectable to the actuator drive, to at least one of an air inflow duct and an air outflow duct, wherein the at least one electropneumatic transducer is configured to activate the at least one of the air inflow duct and the air outflow duct in accordance with an electrical actuation signal, and wherein the device comprises adjustment means for:

measuring at least one position of the 3/3 way valve with the blocking center position;

determining a correction value of at least a control voltage variable of the electrical actuation signal based on the measured position and the electrical actuation signal; and adjusting the electrical actuation signal in accordance with the determined correction value to control the at least one pneumatic booster by the at least one electropneumatic transducer activating the at least one of the air inflow duct and the air outflow duct as a function of the adjusted electrical actuation signal.

12. The device as claimed in claim 11, wherein the adjustment means measures the at least one position of the 3/3 way valve with the blocking center during a calibration phase of the 3/3 way valve with the blocking center.

13. The device as claimed in claim 12, wherein the calibration phase is adapted during a current operation of the 3/3 way valve with the blocking center.

14. The device as claimed in claim 11, wherein the adjustment means measures the at least one position of the 3/3 way valve with the blocking center when the 3/3 way valve with the blocking center is in a fully ventilated position.

15. The device as claimed in claim 11, wherein the adjustment means measures the at least one position of the 3/3 way valve with the blocking center when the 3/3 way valve with the blocking center is in a fully vented position.

16. The device as claimed in claim 11, wherein the adjustment means measures the at least one position of the 3/3 way valve with the blocking center when the 3/3 way valve with the blocking center is in a tightly sealing position with respect to ventilation and venting paths.

17. The device as claimed in claim 11, wherein the adjustment means calibrates the electropneumatic valve during a calibration of the pneumatic actuator drive.

18. The device as claimed in claim 11, wherein the adjustment means is a signal processing device constituting a control unit of the device for operating the electropneumatic valve.

19. The device as claimed in claim 18, wherein the signal processing device is configured to receive a setpoint value, and offset the received setpoint value in accordance with the determined correction value to generate the electrical actuation signal.

* * * * *